(12) United States Patent
van Ardenne

(10) Patent No.: US 6,619,678 B2
(45) Date of Patent: Sep. 16, 2003

(54) SCOOTER

(76) Inventor: Robertus Anthonius Maria van Ardenne, Koningin Wilhelminalaan 30, 3818 HP Amersfoort (NL)

(*) Notice: Subject to any disclaimer, the term of this patent is extended or adjusted under 35 U.S.C. 154(b) by 0 days.

(21) Appl. No.: 10/173,400

(22) Filed: Jun. 17, 2002

(65) Prior Publication Data

US 2003/0034622 A1 Feb. 20, 2003

Related U.S. Application Data

(63) Continuation of application No. PCT/NL00/00930, filed on Dec. 19, 2000.

(30) Foreign Application Priority Data

Dec. 22, 1999 (NL) .............................................. 1013919

(51) Int. Cl.[7] .............................................. B62M 1/00
(52) U.S. Cl. .............................. 280/87.041; 280/87.05; 280/287; 280/40
(58) Field of Search ....................... 280/87.042, 87.043, 280/87.041, 767, 7.14, 287, 40; D21/423

(56) References Cited

U.S. PATENT DOCUMENTS

| | | | | |
|---|---|---|---|---|
| 1,227,888 A | * | 5/1917 | Converse | 280/87.041 |
| 2,170,978 A | * | 8/1939 | Smith | 280/87.05 |
| 2,253,649 A | * | 8/1941 | Price | 224/420 |
| 2,861,814 A |   | 11/1958 | Reblum | 280/243 |
| 3,203,706 A |   | 8/1965 | Boyden | 280/7.12 |
| 3,442,528 A |   | 5/1969 | Rademacher | 280/87.04 |
| 4,555,122 A | * | 11/1985 | Harvey | 280/87.041 |
| 4,707,884 A | * | 11/1987 | Chang | 16/325 |
| 4,799,701 A | * | 1/1989 | Lindau et al. | 188/74 |
| 4,799,702 A |   | 1/1989 | Wang | 280/87.041 |
| 4,805,934 A | * | 2/1989 | Mullenax | 280/13 |
| 4,991,861 A | * | 2/1991 | Carn et al. | 280/11.208 |
| 5,118,122 A | * | 6/1992 | Ricart | 280/11.217 |
| 5,259,632 A | * | 11/1993 | Mahoney | 264/262 |
| 5,848,660 A |   | 12/1998 | McGreen | 180/206 |
| 5,954,349 A | * | 9/1999 | Rutzel | 280/100 |
| 5,984,328 A | * | 11/1999 | Tipton | 280/7.14 |
| 6,120,044 A | * | 9/2000 | Tsai | 280/87.05 |

FOREIGN PATENT DOCUMENTS

| | | |
|---|---|---|
| DE | 4124165 A1 | 1/1993 |
| DE | 29519090 U1 | 1/1996 |
| DE | 29612216 U1 | 9/1996 |
| DE | 29622219 U1 | 2/1997 |
| DE | 29700486 U1 | 6/1997 |
| DE | 29710509 U1 | 10/1997 |
| DE | 19633061 C1 | 1/1998 |
| DE | 19738048 A1 | 3/1999 |
| EP | 0300650 A1 | 1/1989 |
| NL | C 1007245 | 4/1999 |
| WO | WO 95/34461 | 12/1995 |

* cited by examiner

*Primary Examiner*—Brian L. Johnson
*Assistant Examiner*—Brian Swenson
(74) *Attorney, Agent, or Firm*—Hoffmann & Baron, LLP

(57) ABSTRACT

A two-axled vehicle, such as a scooter, is provided having a frame with a platform section. The platform section is connected at the front to a steering column. The vehicle has a front wheel arranged on a steering rod, toward a front of the vehicle, and a back wheel toward the rear. The frame has a back section or tailpiece behind the platform section which projects as far as behind the wheel area and on which the back wheel is arranged. The back wheel has an axle which is supported by a shaped part that can pivot freely with respect to the tailpiece about an axis which is directed downwards and forwards at an acute angle with respect to the support surface ("the road") for the two wheels.

14 Claims, 7 Drawing Sheets

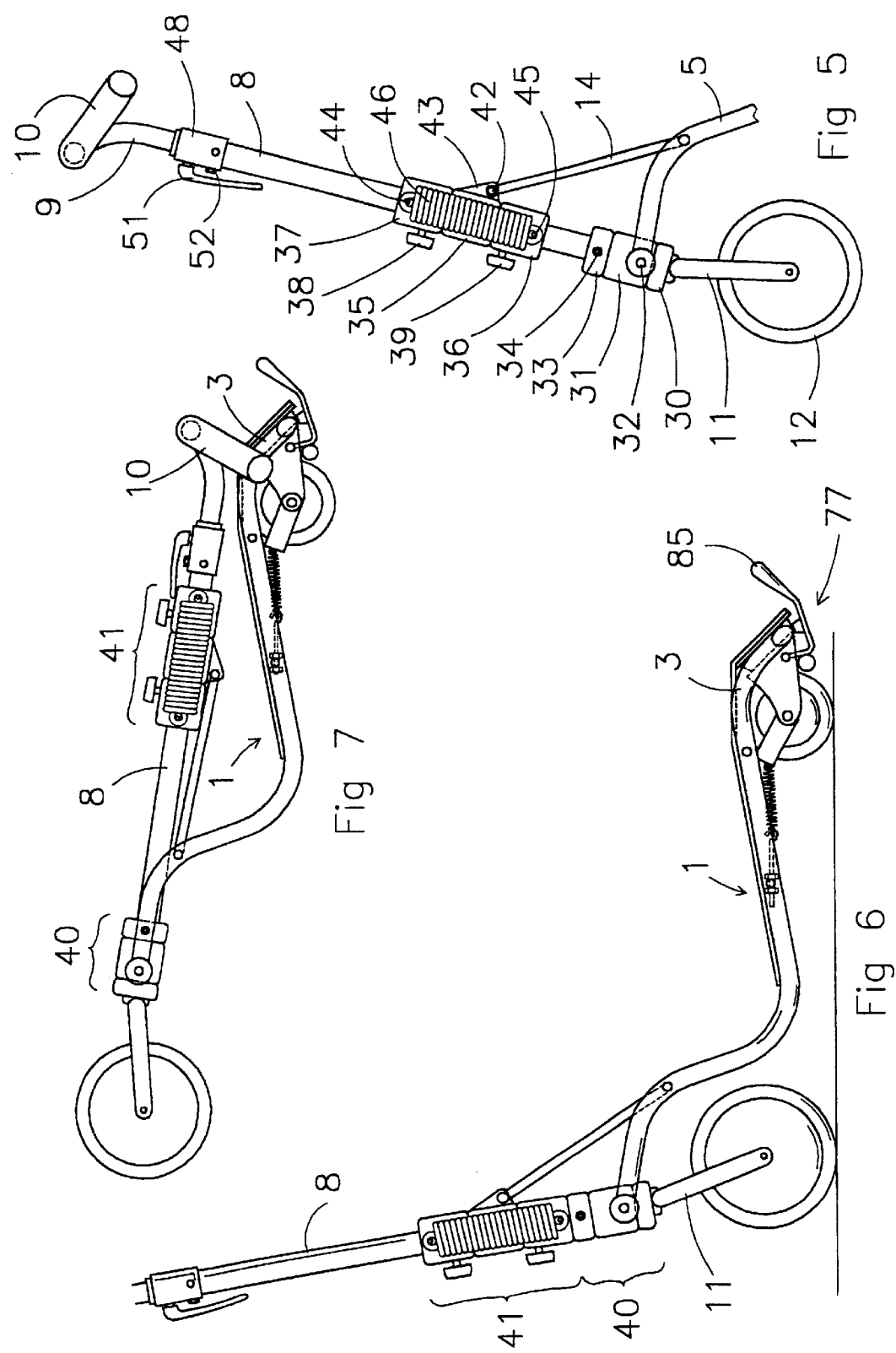

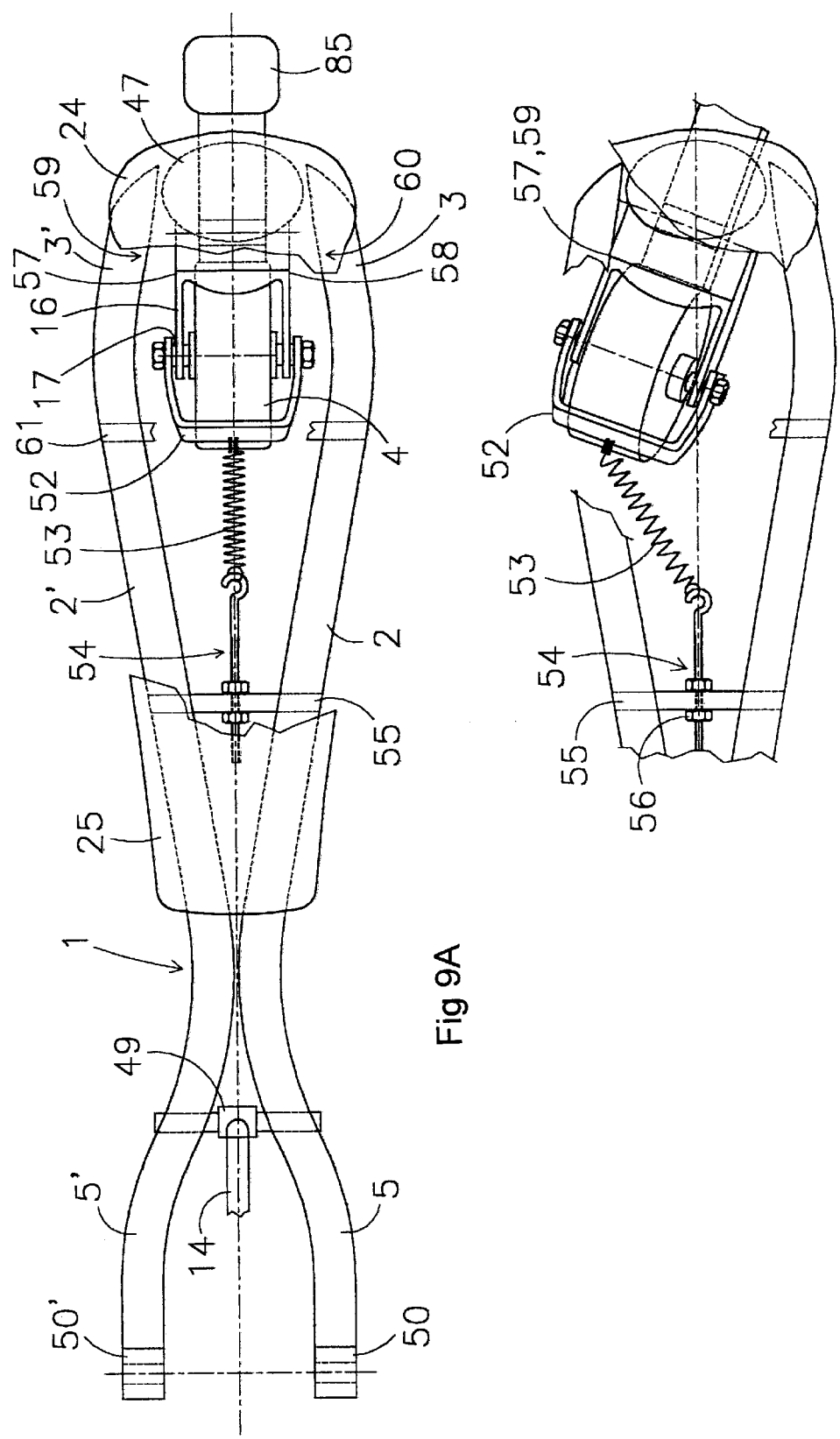

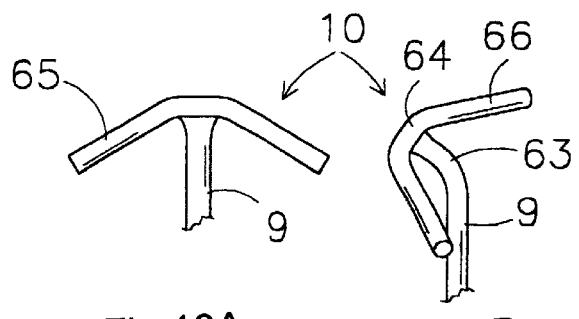
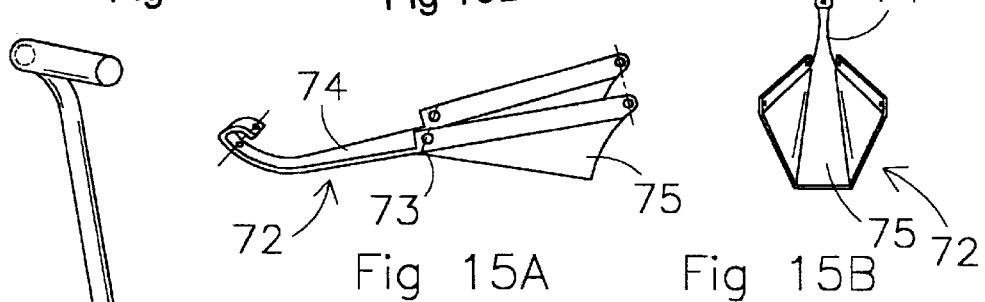
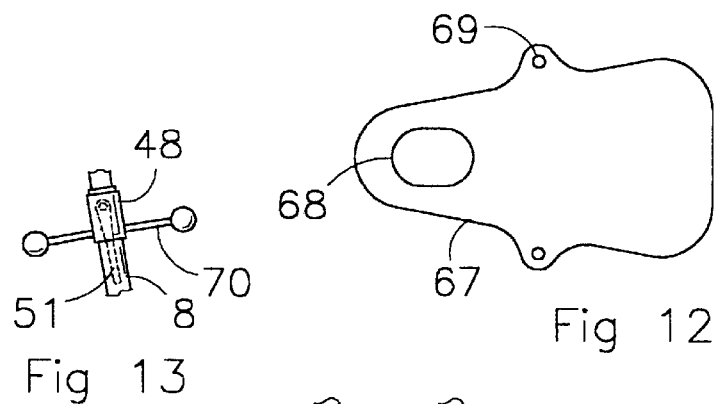
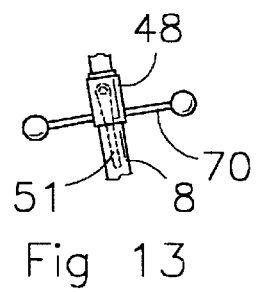
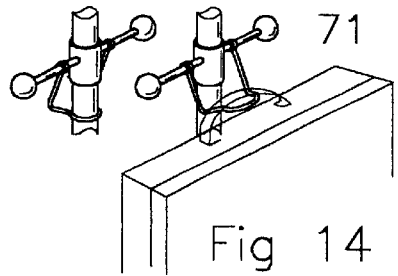
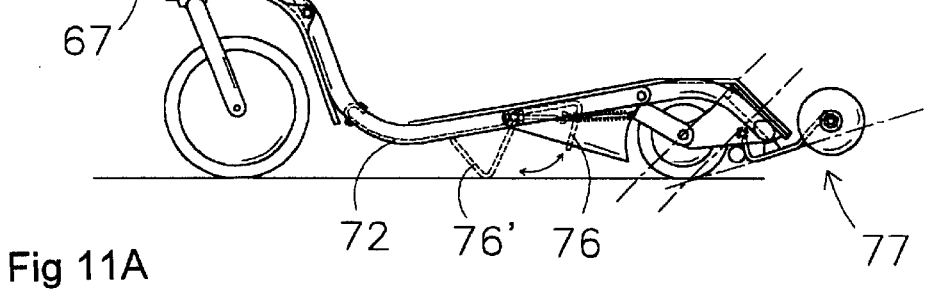

SCOOTER

CROSS-REFERENCE TO RELATED APPLICATION

This is a continuation application of PCT/NL00/00930 filed Dec. 19, 2000, which PCT application claims priority of Dutch patent application number 1013919 filed Dec. 22, 1999, the entities of which are herein incorporated by reference.

FIELD OF THE INVENTION

The invention relates to two-axled vehicles such as scooters.

BACKGROUND OF THE INVENTION

The weight of traffic means that there is a need for an environmentally friendly alternative to or addition to automotive transport. There is a growing demand for an individual means of transport which can be used above all to move quickly and flexibly and which has to be sufficiently compact that it can be carried in public transport, in the car and indoors. The bicycle is not an adequate solution, since it cannot be carried in public transport. The chain drive mechanism means that fold-up bicycles are still too large and too heavy for most children and older people.

An alternative is the familiar scooter, comprising a frame having a platform section, connected at the front to a steering column in which a front wheel is arranged on a steering rod, and provided at the rear with a back wheel. While one foot is on the platform section, the other foot is used to push the scooter onwards. The absence of chain, gears, cranks, pedals and saddle makes the scooter much lighter and less expensive than the (folding) bicycle. However, a drawback which is common to this known scooter and the bicycle is that the turning circle is limited to a diameter of 3 to 4 m at some speed, since only the front wheel can be turned.

Foot-propelled vehicles are known in which the back wheel is designed so that it can be turned, so that the back of the vehicle can also turn. Kinslow (1949), U.S. Pat. No. 2,474,946 and Rademacher (1969), U.S. Pat. No. 3,442,528, describe 4-wheeled vehicles, of which the front and back wheel axles are rotatably connected to the ends of the platform board by means of non-vertical axles. The two extra wheels, situated at a relatively great distance from one another, make these vehicles wider and heavier compared to the known scooter. They also have the common, significant drawback that the two outer wheels turn relatively far outwards when cornering and will project with respect to the platform section, with the result that both vehicles become significantly wider and there is a high risk of them colliding with the pushing foot and hooking behind or hitting something, especially in situations where a rapid, short turn is required in order to be able to avoid something. Yet another drawback is that the two turning devices of both vehicles proposed cannot be controlled independently of one another. A further ergonomic drawback is that the inner wheels, when cornering, turn inwards, with the result that the space available for the foot is limited and positioning the foot is impossible or extremely critical.

Boyden U.S. Pat. Nos. 3,203,706 and 3,023,022 describes, inter alia, a wide, four-wheeled vehicle, in which the wheels are positioned on wide axles beneath the platform board, in such a manner that they can turn inwards obliquely (at an angle of 60–70 degrees with respect to the road) and to a very limited extent (approx. 10 degrees out of the neutral position) with respect to the platform board. Consequently, the board has to be made extremely high, in order to ensure that when cornering the wheels do not run into the bottom of the board, with resultant instability while, at the same time, the turnability is not greatly increased. Boyden also describes a combined use on ice and snow.

There are also patents which proposed vehicles with a platform board and ordinary handlebars, having one front wheel and one back wheel, of which the back wheel can be turned separately. For example, Vaverek (1969), U.S. Pat. No. 3,620,547 describes a variant of a scooter which can be used and is intended for down hill, driven by the force of gravity. The vehicle has an ordinary steerable front wheel and a back wheel which turns automatically when the frame is tilted, specifically in the same direction as the tilting, as a result of the turning axis being directed obliquely downwards and backwards, so that the virtual intersection between the axis and the ground lies in front of the point of contact between the back wheel and the ground. On account of the direction and position of the axis with respect to the back wheel, this design has the drawback that starting to turn to the left using the ordinary handlebars, which will always subconsciously involve the body, handlebars and frame being tilted slightly to the left (as in a bicycle), according to Vaverek also leads to the back wheel turning towards the left, while to go left it is required and expected that the back wheel will turn to the right. Another drawback of the Vaverek design is that the platform board, which is intended for both feet to be placed on (in order to simulate vedeln when skiing), is situated beneath the frame, with the result that when starting up the foot cannot be placed on the center of the platform. The foot which has been positioned off-center causes lateral loads on the frame, leading to undesirable and/or unexpected turning of the back wheel and therefore to unstable situations. Consequently, it is unsuitable for scooter travel on the ordinary road.

Others have also proposed vehicle designs with one or more turnable back wheels, mostly for the purpose of simulating skiing, but they have the common drawback that, on account of the turning device for the back wheel, they are usually longer than the ordinary scooter, with the result that greater spans are required in order to offer sufficient strength. Consequently, they have to be of relatively heavy design, with the result that the vehicles as a whole do not satisfy the conditions imposed in the context of the problem of compactness and light carrying weight in combination with an improved maneuverability.

NL 1 007 245 reflects the closest state of the art.

The main object of this invention is to provide an individual means of transport which can be used to move quickly and flexibly and which is sufficiently compact that it can be carried in public transport, in the car and indoors.

A further object is to provide a scooter-type vehicle which offers entirely new opportunities for sport activity.

Other objects will become clear from the further description.

SUMMARY OF THE INVENTION

With respect to a vehicle of the prior art type, the present invention has a back section or tailpiece that projects as far as behind the back wheel area. The axis is directed forwards with respect to the support surface or ground. The back wheel axle is situated in front of the pivot axis, as seen in the direction of travel.

The shaped part preferably has two supporting arms (referred to below as "the two-pronged fork"), between which preferably a single back wheel with a wide, dimensionally stable running surface is supported via the wheel axle. To reduce the rolling resistance, the running surface is preferably concave, so that instead of a physical line of contact with the road there remains an imaginary line of contact, namely between the two contact points. However, a shaped part which has a single supporting arm with a wheel axle fitting through it is also possible, in which case a wheel (to be referred to below as the "back wheel") is fitted onto this axle on either side of the arm, in order to create the same preferred contact line characteristic.

The above-mentioned suspension of the back wheel axle firstly makes the back wheel self-righting, so that it will seek to run straight on under the influence of a vertical load in the vertical position of the scooter. The wheel stabilizes itself and cannot wobble. Secondly, if the frame is tilted slightly out of the purely vertical position, the shaped part together with the back wheel will turn outwards the other way, so that a bend is steered into even though the front wheel, which is operated by traditional handlebars, just remains facing straight ahead. The bend is in the same direction as that in which the scooter is tilted out of its vertical position. The result is extremely great maneuverability which can be enhanced still further by also steering the front wheel.

The entire principle of the invention is suitable for being of very short, low and narrow design. Stability is enhanced by a low-lying centre of gravity, which is achieved in a design in which the platform section runs obliquely forwards and downwards in a direction which intersects the front wheel in the vicinity of the location where it is in contact with the supporting surface, while at least a part of the frame is at a lower level than the highest point of the back wheel.

To allow the low frame to tilt to its maximum extent, the lowest point of the platform section is also the narrowest part, while the highest section, just above the back wheel, is the widest part.

Preferably, the scooter is furthermore designed in such a manner that the frame, at least in the region in front of where the shaped part is attached to the tailpiece, comprises two parts which are at a horizontal distance from one another, and that the shaped part has the front corners of its top surface located between and at a certain distance from the said frame parts, so that the said frame parts limit the angle of deflection of the shaped part together with the back wheel. This limitation of the angle of deflection is a safety measure which is taken because otherwise the combination of relatively high speeds and very sharply taken bends could give rise to a risk of the back wheel "escaping".

The frame is made rigid and strong by connecting the frame tubes to one another in front of and behind the platform section using a transverse element, for example by welding a strip of metal between them. The advantage of this is that as a result the vehicle transmits steering tilting movements "one by one" to the back wheel, but also that as a result the back wheel reacts very directly to changes in pressure passed on via the feet, which may be brought about as a result of changes in the body posture and movement. However, the rigidity is detrimental to the ride comfort. However, this can be made resilient again by simple means as a result of a relatively thin plate of flat but flexible material, for example 6 mm triplex, being prestressed across the two said transverse connections, with the result that the plate adopts a convex position and during riding the centre part of the footplate cannot bend sufficiently far to reach the tubes. Good shock absorbing can be achieved by arranging an overlapping layer of rubber between transverse connection and plate, so that the plate material is supported on the rubber. The prestressing is easy to achieve by welding the two connecting strips between/on the tubes not in a flat position, but rather at an angle of, for example, 40 degrees with respect to one another, i.e. each facing upwards towards one another at an angle of approximately 20 degrees with respect to the tube.

To increase the number of degrees of freedom in movement and the number of driving techniques, a large number of use adjustments are possible. For example, the scooter may be designed in such a way that front fork and shaped part are provided with a plurality of holes for the front axle and back axle, respectively. In this way, it is possible to move the wheels, so that the length of the pivot arm of the back wheel or the steering characteristics are altered.

The vehicle according to the invention offers a number of completely new possible uses which cannot be achieved with a bicycle or a traditional scooter, nor with other sports equipment, such as skateboards. It is possible to gain speed by executing defined movements using the scooter. One of these becomes possible if the back wheel in its shaped part is pulled towards its central position by a spring.

The vehicle is designed so that it can be folded together or folded up, in a similar way to a folding bicycle, if it is designed in such a way that the front wheel of the frame is attached with respect to a steering tube of the steering column by means of a hinge pin which is perpendicular to the longitudinal central plane of the frame in the "straight-on" position of the front wheel.

A design of high strength and stability which can still be folded up is obtained if the steering tube is composed of a fixed steering tube assembly, which bears the hinge pin for connection of the frame and inside which a fork rod can be displaced in rotation but not in the axial direction, and a slideable steering tube assembly, which can slide in the axial direction and rotate about the fork rod and is hingedly connected to the frame by means of a stabilizing element, which can itself execute hinged movements with respect to the slideable steering tube assembly. Given suitable dimensions, the scooter which has almost been folded up can be carried over the shoulder.

A new, interesting possibility for maneuvering and also for increasing speed, for example, by movements executed using the arms are obtained in a design in which the unit comprising the front wheel of the frame, the steering column, the fixed steering tube assembly, the slideable steering tube assembly and the stabilizing rod is dimensioned in such a way that the steering column is both statically and dynamically adjustable between a limit inclined-forwards position and an arbitrary inclined-backwards position.

It is also possible for the slideable steering tube assembly to be designed in such a way that the steering column can only be dynamically adjusted, specifically in such a manner that, starting from a limited, furthest forwards position, the column can only be pulled backwards under a rising spring stress. The advantage of this design is that the position in which it slopes furthest backwards is also clearly limited. This point can be optimally selected by means of design measures so that the center of gravity of the body, which will move backwards as a result of the change in the angular position of the steering column, will never lie beyond the back wheel. This means that the mobility of the steering column can be maximized while also ensuring stability of the body.

It is still possible to travel with a fixed, sloping-forwards position of the steering column, so that the wheel base is shortened, providing the scooter with a different driving performance, but it is also possible to use the handlebars to execute a pump-action movement as a combination of inclining the steering column forwards and backwards and tilting the scooter towards both sides. This is once again a hitherto unknown possible movement for a vehicle, with which bodily energy can be converted into speed.

It is advantageously also possible to use the handlebars to steer in the opposite direction to a bend which is launched into by tilting left and right, resulting in a slalom-like movement and also converting bodily energy into speed.

The conversion of energy into speed can be promoted by scale. Larger wheel sizes allow the pivot arm of both the front wheel axle and the back wheel axle to be oversized with respect to their respective pivot pins (i.e. the distance in cm between the wheel axle and the pivot pin), while the short distance from the platform part to the road is nevertheless maintained. The advantage of this is that the wheel deflections of both front and back wheel can become much greater and that it is therefore possible to make more effective use of energy feedback from cornering, resulting in a vehicle which can increasingly be kept at speed more by means of the weight and power of the body, and therefore needs to be pushed by foot only when it is being started.

Many traditional scooters are provided with a brake which acts on the back wheel and can be operated using a heel at a location at the end of the platform section of the scooter. In the scooter according to the invention, the braking aspect is preferably resolved in such a way that a brake is arranged on the shaped part of the back wheel. In this way, the brake remains active in all pivot positions of the back wheel.

In this case, the brake is preferably operated not from the platform section, since in that area, with a view to achieving a compact structure of the entire vehicle, there will be space for a bit more than one foot—the standing foot—while the pushing foot, when it is not actively pushing, can also be supported on the tailpiece. Therefore, it is advantageous if the brake is formed by a lever which projects behind the tailpiece, where it can be operated, and on which lever there is a brake block, so that the latter comes to bear against the running surface as a result of actuation.

A lever of this type which projects behind the tailpiece as part of the brake can, for example if the scooter is used to drive off a kerb, grind along the road. To prevent this, the solution is proposed that that part which projects behind the tailpiece bears a wheel with a rotation axle which is perpendicular to the central longitudinal plane of the scooter. To operate the brake, the wheel is simply pressed downwards, and the wheel makes it possible to drive off a kerb or similar elevated structure without problems.

There are also various interesting possibilities relating to the steering.

For example, an improved posture can be achieved if the steering rod has a part which is bent forwards and on which the handlebars are arranged, and if the handlebars are formed by two parts which run obliquely downwards and backwards with respect to a short center piece, each being of a length which is approximately equal to the width of a hand. Moreover, narrow handlebars contribute to safety and make the scooter lighter and more compact, thus also improving the portability.

Other maneuvering options are achieved if not only the back wheel can pivot in the manner indicated, but if the front wheel together with the front wheel axle is/are supported by a shaped part which can turn with respect to the front part of the frame about an axis which is directed downwards and backwards at an acute angle with respect to the support surface ("the road") This can be achieved in two ways. The said axis, which is imaginary, can be physically realized by being formed by a steering column with handlebars. But instead of rotatable handlebars there may be a non-rotatable tilting element for the vehicle, which is rigidly connected to the frame at least in the lateral direction. This tilting element does not have to coincide with the said imaginary axis, but rather may be arranged outside it on the frame.

In that case, there is no longer any need for handlebars for the purpose of influencing the position of the front wheel, since this automatically occurs in the event of lateral tilting—in the opposite direction, obviously, so that the back wheel and front wheel in combination consistently steer into a clear bend—but the tried-and-trusted handlebars may be retained for the two hands to be placed on, or it is possible just to have a knob which is to be operated by one hand.

The idea of using a turning axis which is directed downwards and backwards at an acute angle with respect to the road for the front wheel "suspension", as has just been outlined, has been developed as a more detailed embodiment of the basic idea of the invention, as described in claim 1, with the result that the maneuvering options can be extended still further using the same pivoting principle. Surprisingly, however, it has been found that it is also of interest if simply the steering column in the folded-up position, takes an inclined-forward position and the axle of the front wheel is situated behind the center axis of the steering column.

This can be used with a fixed back wheel or with a back wheel which can pivot according to the invention. Although this is at the expense of a dynamic adjustment of the steering column during riding, it does provide a simpler and therefore less expensive vehicle with maneuvering possibilities which have been hitherto unknown.

Conversely it turns out that, while the dynamic adjustability was developed as an elaboration of the basic concept of the invention, this feature in itself is also interesting when applied with a two-axled vehicle which just has fixed front and back wheel axles.

Then, it is preferable once again to use a fork with a single front wheel and a wide running surface or a fork part with a wheel on either side with punctiform contact with the road. The loading in combination with the two wheel contact surfaces with the road has a stabilizing effect on the riding characteristics. A vehicle of this type has the same, albeit reduced, self-aligning effect when the frame is tilted as the vehicle with a pivotable back wheel according to the invention, but has the advantage that the turning of the wheel resulting from tilting of the frame can be influenced by hand using the handlebars.

Furthermore, the handlebars can be made to execute hinged movements as described, with the same advantages. It is thus possible for an ordinary scooter with a fixed back wheel also to be made self-aligning and to make a very small size of scooter much more stable.

To make this design foldable, the invention also provides design options.

However, surprisingly it is also possible, using the same inventive idea, to design the scooter for use on snow, both substantially horizontally and on a slope. This can be achieved if, in the designs described, the wheels are replaced by snowboards or by short skis.

Finally, an embodiment which is designed for use on ice is also possible. In that case, the wheels are replaced by double skates or double blades.

Since the operating techniques are not dependent on pushing off by foot, an embodiment with a motor drive is also conceivable.

The invention will be explained below with reference to the drawings in which like numerals represent like elements throughout the several views.

DESCRIPTION OF THE DRAWINGS

FIG. 5 shows from a preferred embodiment, once again slightly diagrammatically, the front section of the scooter, illustrating the possibilities for static and dynamic adjustments of the steering column and foldability;

FIG. 6 shows a new position of the steering column which can be reached with the design shown in FIG. 5;

FIG. 7 shows how in this way the scooter can be folded together completely;

FIG. 9A shows a plan view of the scooter without steering column, with partially cut-away components, in the "straight-on" position of the back wheel;

FIG. 9B shows the rear section in a position in which the back wheel has moved, and a corner will be taken;

FIG. 10 (cf. FIGS. 3A and 3B) diagrammatically depicts a preferred embodiment of the steering rod, viewed from behind and obliquely from the side, respectively;

FIG. 11A shows the same design of the scooter, provided with a number of accessories;

FIGS. 12–15 show separate views of various accessories.

DETAILED DESCRIPTION OF PREFERRED EMBODIMENTS

Figure 1:
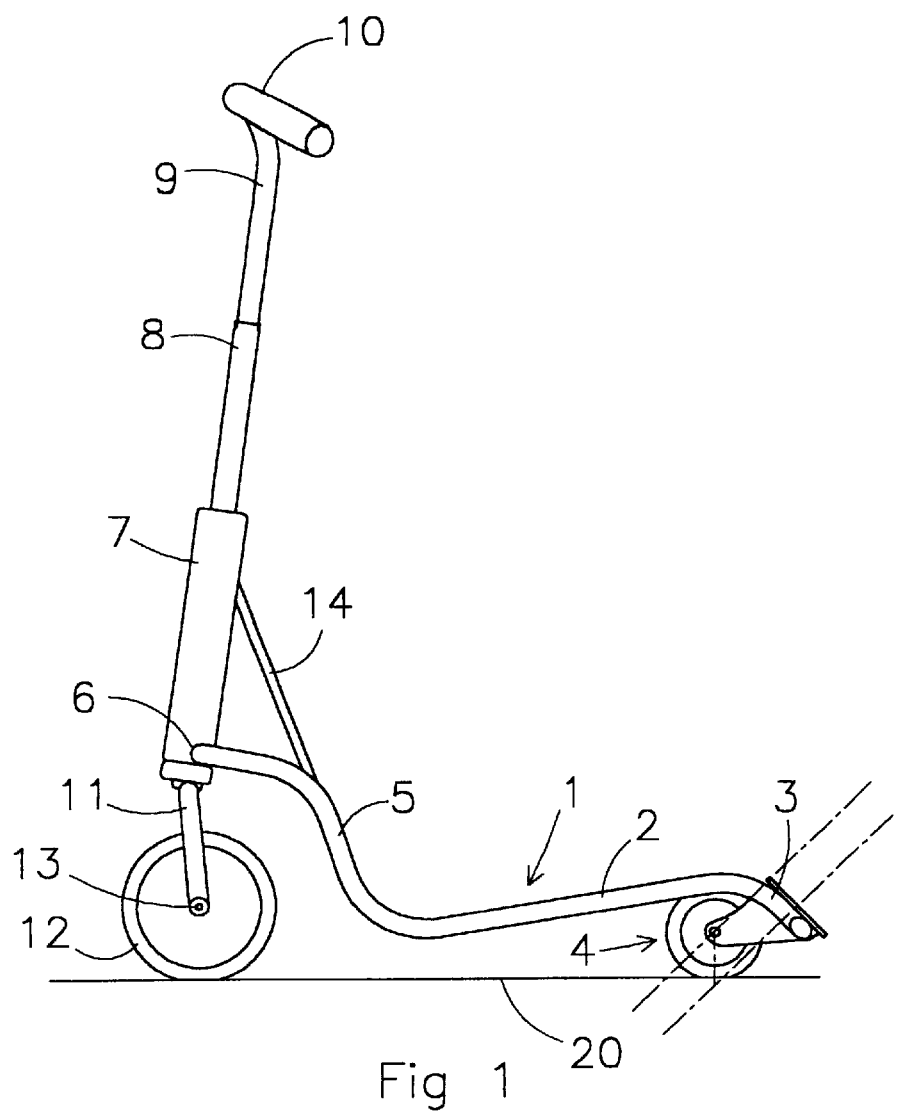
FIG. 1 diagrammatically depicts the structure of the scooter according to the invention.

The frame 1 has a substantially straight platform section 2 which is inclined upwards at a small angle towards the back and merges into a tailpiece 3 which runs downwards at a large angle, extends to beyond the area of the back wheel 4 and supports the back wheel 4. At the front, the platform section 2 merges into an S-shaped section 5.

At the front, at point 6, the S-shaped section is connected, at as low a position as possible, to a steering tube 7. The latter accommodates a fork rod 8 in which there is a vertically adjustable steering rod 9 with handlebars 10, while at its bottom end it bears a fork 11, which is preferably rearwardly angled by between 10 and 20° with respect to the fork rod, for a front wheel 12 which can rotate about the front wheel axle 13.

There is also a reinforcement 14 shown between the S-shaped section 5 of the frame and a higher point on the steering tube 7, although this reinforcement is not essential to the principle of the invention.

The tailpiece 3 of the frame bears on its underside a shaped part 16, referred to as a two-pronged fork, which can pivot freely about an axis 15 and has an axle 17 for the back wheel 4. The pivot axis 15 is directed obliquely forwards and downwards and lies at a distance 18 below the line 19 which runs through the back wheel axle 17 parallel to the pivot axis 15. The pivot axis 15 forms an angle of approximately 45° with the road 20. If the point 21 on the pivot axis which is at the level of the bottom edge of the tailpiece 3 is referred to as the "turning point", this turning point lies at a height above the road 20 which is between the height of the back wheel axle 17 and the highest point of the back wheel 4, which point cannot be seen in FIGS. 1 and 2, since the frame 2 will be able to comprise two pieces of tube, in which case the back wheel 4 can pivot freely beneath and in the space between the said tubes of the frame.

The effect of the fact that turning point 21 and pivot axis 15 lie behind the back wheel axle 17—which forms the core idea of the invention—is that under the influence of vertical load—even just the weight of the scooter, but above all the body weight which has been positioned on the scooter—the back wheel will seek to face forwards. The pivot arm together with the back wheel is therefore self-aligning and actively damped, with the result that the wheel stabilizes itself and cannot wobble, without, for example, a forwardly directed tension spring being required for this purpose.

A second effect occurs if we were to steer into a bend using the front wheel by turning the handlebars. We will automatically incline the body slightly into the bend in order to retain our balance. We make this reflex movement without realizing, and consequently the frame will also tilt slightly, together with the steering column. The pivoting design according to the invention then ensures that the back wheel starts to steer with the bend, thus shortening the bend. The rider can also achieve this deliberately by imposing not a vertical load, but rather an angular load on the frame, without first turning the front wheel using the handlebars, thus tilting the scooter as a whole slightly left or right out of its vertical plane. The abovementioned self-aligning action then has the effect of pivoting the back wheel in the opposite direction to the tilting direction, so that the scooter travels through the desired bend. This effect will occur not only at speed but also at a standstill if the running surface of the back wheel 4 is wide and dimensionally stable. This is because in this case, since the back wheel is pivoting, the body pressure can be distributed uniformly over the entire width of the contact area between the wheel and the road. The harder and more dimensionally stable the running surface, the less deformation occurs and the more immediate the reaction of the back wheel to tilting will be. Therefore, the back wheel is preferably provided with a planar, solid hard rubber or polyurethane running surface of a width of approx. 4 cm, resulting in linear contact with the road of a width of no more than a few millimeters.

The result of this design is that a turn can be initiated both by the front wheel and by the back wheel; in practice, it will be more or less a mixture of the two. Therefore, in the scooter according to the invention changes in direction during travel are effected firstly by using the body to tilt the scooter to the left or right, while sudden changes of direction and steering adjustments can be carried out quickly and directly by turning the front wheel. Particularly in view of the fact that the wheel base, i.e. the distance between the front wheel and the back wheel, can be kept very small (as will be explained in more detail below), and by using both steering techniques simultaneously and deliberately, in this way unprecedentedly good maneuverability and direct steering are achieved.

For considerations of comfort and safety, the front wheel is preferably designed to be somewhat larger than the back wheel. It is also conceivable for the said characteristic of a wide running surface to be achieved by composing the running surface of two (or more) narrow surfaces, by using a pair of wheels with punctiform running surfaces. The advantage of this is that the frictional resistance between tire and road is lower since the wheels are mounted separately and the contact area is much smaller, and that slight unevennesses in the road, such as small stones and holes, have less influence on the riding characteristics and that the double contact surface works as a shock absorber.

Figure 3A:
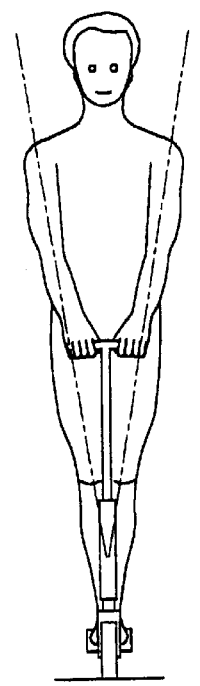
FIGS. 3A and 3B show the ergonomically favorable positions of the body which are possible with the scooter according to the invention.
Figure 3B:
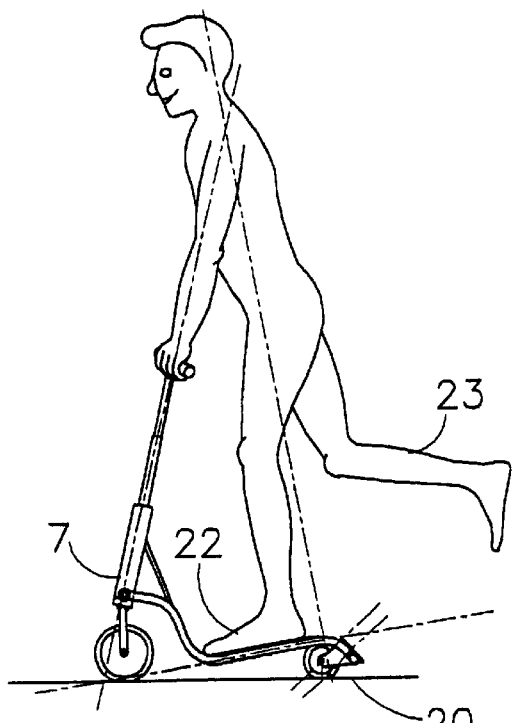

FIGS. 3A and 3B show that it is possible, with the scooter according to the invention, to obtain a posture which is anatomically correct in all respects during use. This obviously assumes that the user has adjusted the handlebars to a suitable height (in a manner which is yet to be discussed) and also takes into account the particular features of the steering rod and handlebars which are yet to be discussed. FIGS. 3A and 3B show a stable movement posture in which the two arms can always remain extended and naturally come to lie substantially in line with the steering column, converging towards the front wheel, with the result that the head and the upper body are perfectly supported with extended arms and therefore with minimum muscular effort, and with the result that the head, hands and front wheel come to lie substantially in one plane. As a result, the pressure exerted by the head and upper body via the two arms and hands, in terms of direction, virtually coincides with the contact area between the front wheel and the road.

In combination with the virtually straight lower back which already results from the possibility of positioning the standing foot directly behind the front wheel, the overall result is a very stable body posture in which the lower back remains free from load, causing less effort and reduced fatigue, so that the vehicle according to the invention can continue to be used for a long time without (muscle) pain or fatigue in the lower back.

It should also be clear from FIG. 3B that this stable posture is partly achieved through the fact that the direction of the platform section, on which the standing foot 22 is placed, intersects the plane of the road 20 approximately at the location of the intersection between the steering column and the road. This improves the push-off position, since the standing leg is automatically bent slightly, so that the user is closer to the road, with the result that he can push off more powerfully and for a longer distance. On account of the short distance between the standing foot and the road, the stability is high and less energy is lost through pushing up the body and cushioning it again for each pushing movement.

Figure 4:
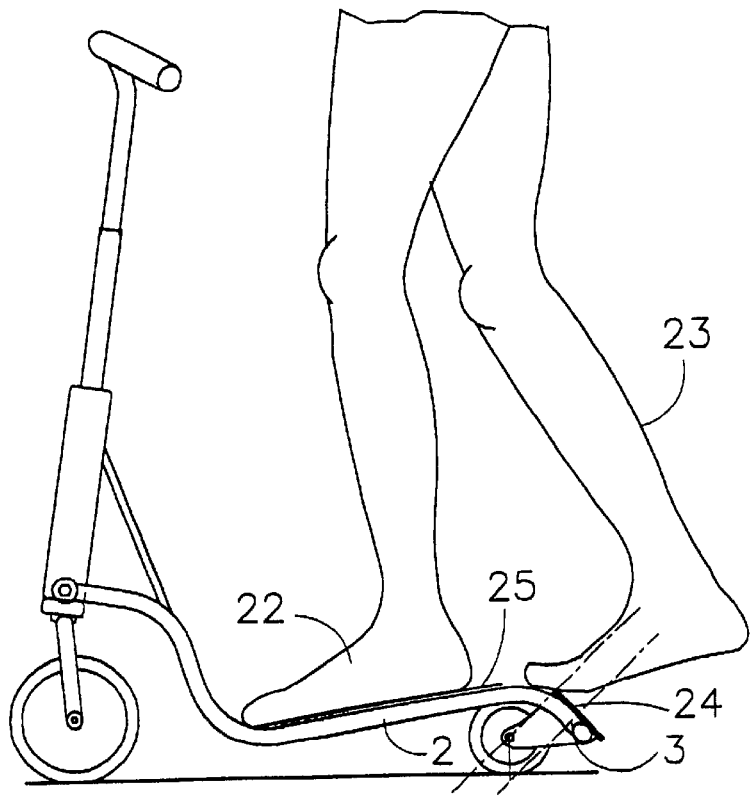
FIG. 4 shows an enlarged view of how the feet can be positioned on the scooter once speed has been reached.

FIG. 3B also shows the pushing leg 23 after a pushing movement of the scooter. During the starting phase, one or two such pushing movements are sufficient to attain speed, and then the pushing leg 23 can be moved into the at-rest position on the tailpiece 3, which for this purpose is provided with a small plate 24, in the same way that a small plate 25 is arranged on the platform section 2 (FIG. 4).

As a result of the pushing leg being placed onto the tailpiece 3 and because the user is standing upright, the weight of the standing leg can be partially transferred to the pushing leg. Positioning the two feet around the back wheel provides optimum possibilities for influencing the back wheel by means of body movement. Since the tailpiece runs downwards and is at a lower level than the length of the platform section 2, the pushing foot can also be positioned close to the road, so that it is easy and quick to step down under virtually any circumstances. Since the back wheel is small and the platform section continues obliquely to below the wheel, the scooter can be kept very short, narrow and compact. After all, the pushing foot does not have to be positioned in front of the back wheel, as in a normal scooter. The pushing foot can be positioned by feel, without having to look.

A more detailed embodiment will now be described with reference to the following figures. This embodiment is aimed at making the entire vehicle foldable and, moreover, allowing different angular positions and angular paths of the steering column to be set.

Figure 2:
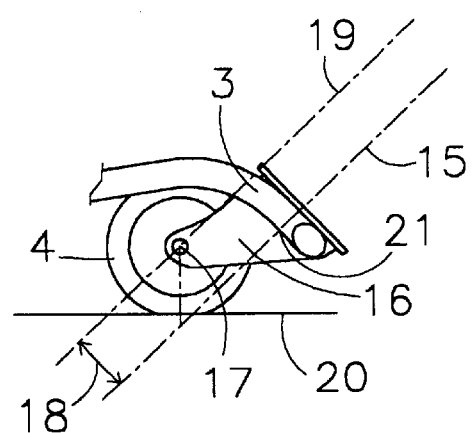
FIG. 2 shows a sketch illustrating how the scooter operates.

For this purpose, the component which was diagrammatically depicted as steering tube 7 in FIG. 1 is composed of various parts, cf. FIG. 5.

At the bottom end of the fork rod 8 there is a tube element 30, which is supported on the fork 11 and therefore is also turned when the front wheel 12 is turned by means of the handlebars 10. Above this tube element is a rotary/hinge element 31. The rotary function means that the fork rod can rotate freely inside it, and the hinge function means that the top end of the S-shaped part 5 of the frame is attached to it by means of two pivot points with hinge pin 32. The element 31 is therefore connected to the frame in such a manner that it cannot rotate about a substantially vertical axis, while it remains possible to turn the handlebars. Above this is a second tube element 33, which is fixed with respect to the fork rod, for example by means of a socket-head screws, denoted by 34, in order in this way to hold the element 31 in place between the elements 30 and 33.

The parts 30, 31 and 33 will be referred to jointly as the fixed steering tube assembly 40.

Then, a slideable steering tube assembly 41 is arranged on the fork rod 8, formed by a rotary/sliding element 35 and two separate fixing elements 36 and 37.

The rotary function of the rotary/sliding element 35 means that the fork rod 8 can rotate with respect to the element 35. The sliding function means that the said element 35 can slide along the fork rod 8. The fixed angular position on the fork rod is then defined by the two fixing elements 36, 37, specifically by these two elements being secured with respect to the fork rod 8, preferably using two studs with operating knobs 38 and 39, respectively, so that the fixing can be performed and released quickly and element 35 can be moved into a different position.

Between the rotary/sliding element 35 and the bent section 5 of the frame is the stabilizing element 14 which was already present in the diagrammatic illustration shown in FIG. 1. It can be seen from FIG. 5 that the top end of the stabilizing element 14 is attached, by means of a hinge joint 42, to a fitted part 43 of the element 35.

With the design described, it is possible, after the knobs 38 and 39 have been unscrewed, to pivot the entire steering column out of a position in which it is inclined backwards, at approximately 80°, as shown in FIG. 5, about the pivot points 32 which form the connection between the frame and the steering column, into a new position, in which it is inclined forwards at approximately 80°, as shown in FIG. 6, or any intermediate angular position of the steering column, which may vary between 70 and 80 degrees. This new angular position of the steering column provides additional movement options for the scooter. It can be seen from FIG. 6 that the said limit position is determined by the fact that the upper or slideable steering tube assembly 41 as a whole has been slid downwards to its lowest position, i.e. the position in which this assembly bears against the bottom or fixed steering tube assembly 40. This downwards sliding of the top steering tube assembly takes place automatically, obviously after the fixing knobs have been unscrewed, when the steering column is moved forwards, as a result of the presence of the fixed-length stabilizing element 14. In that case, it is only necessary to unscrew knob 38. Conversely, this same stabilizing element 14 obviously also ensures that the top steering tube assembly 41 slides back upwards when the position of the steering column is changed from a position in which it is inclined forwards to a position in which it is inclined further backwards, i.e. back from the position shown in FIG. 6 towards that shown in FIG. 5.

It will be possible to fix the steering column in any selected new position by tightening the knobs 38, 39 again. If rotary/sliding element 35 is not enclosed between the two fixing elements 36 and 37, the path is angular and the result is a dynamic adjustment of the steering column, the limits of which are determined by the position of the fixing elements.

If the steering column is hinged backwards to beyond a working position as shown in FIG. 5, the slideable steering tube assembly can slide further upwards along the fork rod 8, specifically until a completely folded-together position as shown in FIG. 7 is reached, in which the handlebars lie above and on either side of the tailpiece 3. If, in this position, the slideable assembly 41 is fixed again with respect to the fork rod 8, simply by fixing knob 39, the result is a compact, elongate and narrow unit which can easily be carried by hand or in the boot of a car or in the luggage rack of a train.

To enable the wheels to be brought more into line in the folded-together state shown in FIG. 7, and thus to reduce the height of the assembly, the position of the hinge pin 32 in FIG. 5 may advantageously also be shifted forwards from the centre of the steering column, by attaching the ends of the bent part 5, by means of a hinge joint, to an attached part on the front side of element 31. An additional advantage of shifting this hinge point forwards is that in the event of dynamic movement of the steering column out of the "furthest forward position", it is possible to execute a longer movement of the handlebars before wheel axle 13 coincides with the new shifted-forward hinge point, and that the weight of the rider himself has to be lifted further from the road. On the one hand, more energy is required for this, but on the other hand it is also the case that more energy is released during the return movement of the handlebars, some of which energy can be used to maintain the speed. The heavier the rider, therefore, the greater the effort which needs to be applied, but also the greater the propulsion which can be obtained therefrom.

Returning to FIG. 5, it can be seen that each of the fixing elements 36 and 37 is provided with a hook or pin 45 or 44, respectively, between which there is a relatively heavily prestressed tension spring 46. An assembly of this type is arranged on both sides of the steering column. These springs pull the slideable assembly 41 together, to form a unit as it were, which in principle is hingedly connected as a unit to the stabilizing element 14 and, also as a unit, can rotate freely about the fork rod 8 and can slide along the latter. If, in the "furthest forward position" of the steering column shown in FIG. 6, only the bottom fixing element 36 is fixed with respect to the fork rod 8 with the aid of rotary knob 39, the steering column can be hinged backwards under the force exerted by an arm, with the springs such as 46 being stretched, and with the slideable elements 35 and 37 being slid upwards. The angular path is dynamically limited by the maximum extension of the springs 46. This technique of travel can be used in particular in bends; it has been found to give a propulsive effect if the steering column is then allowed to move from the back forwards again on a straight section of road under the influence of the spring force. It is also possible to select a dynamic steering column adjustment in which only knob 38 is fixed, for example at an angular position as shown in FIG. 5. The steering column can then only be moved forwards under the influence of spring tension. The presence of the springs such as 46 also limits the operation of folding the scooter into the storage or transport position shown in FIG. 7 to a single operation. This is therefore a simpler and quicker process.

By replacing the two tension springs 46 on either side of the rotary/sliding element 35 of the slideable steering tube assembly 41 with one, heavier compression spring which is positioned between the top fixing element 37 and the rotary/sliding element 35, around fork rod 8, by omitting the bottom fixing element 36 and then fixing the fixing element 37 with respect to the fork rod 8 with the aid of knob 38 or clamping bracket, it is also possible for the dynamic steering column adjustment mentioned first in the previous paragraph to be brought about, enabling the steering column to be pulled backwards out of the "furthest forwards position" shown in FIG. 6 using force applied by the arms. The compression spring and the elements 35 and 37 are preferably formed into a single unit by means of welded joints. This design has the advantage over the abovementioned design with the tension springs 46 that the end of the angular path is now also delimited by a fixed point instead of dynamically. This is in fact the angular position in which element 35 is pushed against fixing element 37 under the maximum spring stress, so that the turns bear fully against one another. The maximum change in angle and the pushing force required for this purpose can thus be selected in advance and it is impossible for there to be any spring ageing caused by overextension. Moreover, a single spring is sufficient, and in addition it is positioned neatly around the fork rod 8. The most important advantage of connecting the compression spring and the elements 35 and 37 fixedly to one another is the stabilizing of the steering, since the fork rod 8, after rotation, on account of the effect of torsion in the spring, will seek to return to the neutral starting position. Another advantage is that fixing element 37 and therefore knob 38 cannot rotate with respect to the tension rod 14.

To facilitate and accelerate folding and unfolding, however, knob 38 is preferably not used during folding, but rather the steering column or one of the elements situated thereon is provided with a means which, when the scooter is folded up, automatically hooks into and latches securely onto a spring element which forms part of tailpiece 3. Advantageously, an additional ring element is also arranged around the top of fork rod 8, serving only to make it easy to make the fully folded vehicle shown in FIG. 7 ready to ride again. This is because the fixing position of the ring element is selected in such a way that, in the folded-up situation shown in FIG. 7, fixing element 37 is pressed against the ring element under approx. 50% of the maximum stress of the compression spring, so that when the click-action latch is released, the steering column will automatically fold open again, as a result of the compression spring springing open, in such a manner that the handlebars can then simply be pivoted upwards by hand after a foot has been placed onto the platform.

It can also be seen in FIG. 5 that a clamping sleeve 48 is arranged at the top of the fork rod 8, in order to securely clamp the steering rod 9 in a set vertical position with respect to the fork rod 8. The clamping sleeve 48 is equipped with a strap or quick-acting clamp 51. To achieve the clamping action, the top end of fork rod 8 is provided, in a manner known per se, with a slot which ends in a round hole. The clamping sleeve can be fixed, for example with the aid of a socket-head screw 52. The thread by means of which the strap 51 is arranged in a threaded hole in clamping sleeve 48 is preferably dimensioned in such a way that a downwardly directed position of strap 51, as shown, corresponds, for example, to the steering rod 9 being clamped in place, and a position in which the strap has been rotated upwards through 180° corresponds to the position in which the steering rod is released.

Figure 8B:
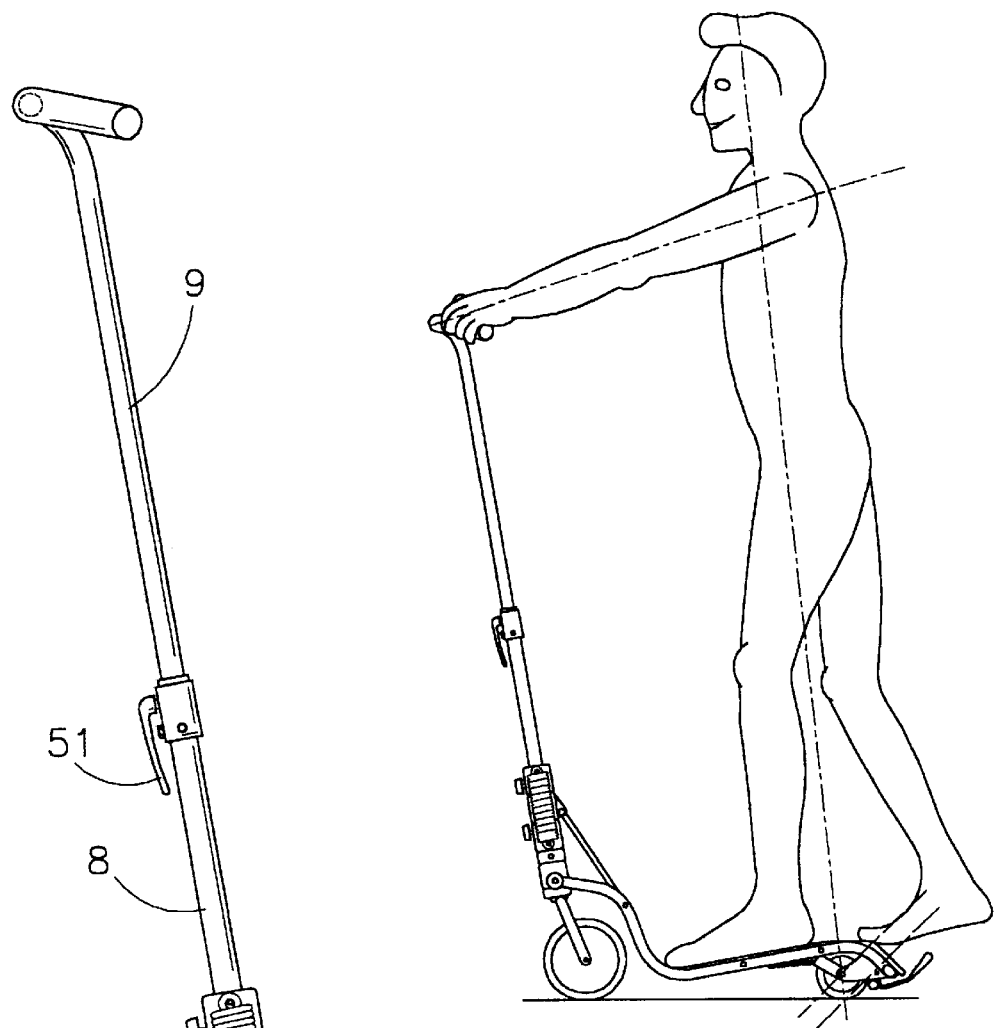
FIG. 8B shows the body position which can be achieved as described in FIG. 8A.
Figure 8A:
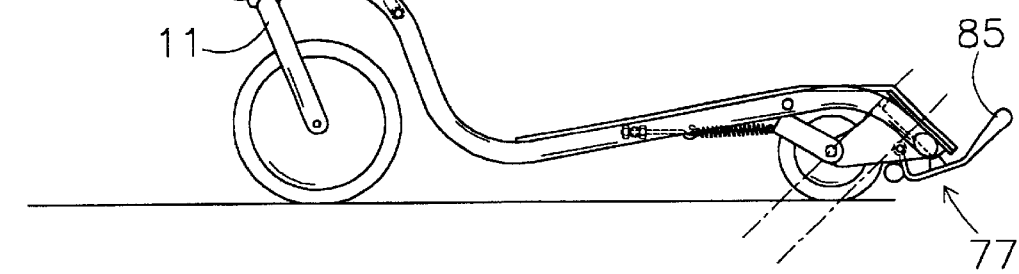
FIG. 8A shows the scooter with the steering column in the position shown in FIG. 6 but with the steering rod fully extended.

FIGS. 8A and 8B therefore show the scooter with the steering rod almost completely extended. When this figure is compared to FIG. 6, it will be clear that the steering rod can be given a relatively great length—in practice some 1.40 m—corresponding to the space inside the fork rod 8 in the lowest position (shown in FIG. 6) as far as the fork 11; as a result, the handlebars 10 can be positioned at a great height. In this way, the handlebar height can be adjusted for an ergonomically correct posture as shown in FIGS. 3A and 3B, to match the size of the rider. Furthermore, for more active use of the numerous dynamic options of the scooter, especially that of moving the steering column backwards and forwards as described with reference to FIGS. 5 and 6, in the "furthest forwards" position the handlebars can be of great height, so that it will be possible to tilt the steering column with little physical force.

FIG. 9A shows an enlarged, diagrammatic plan view of the frame together with the back wheel assembly. It can be seen that the frame 1 is produced from two bent tube pieces. (It is also eminently possible to use a single tube piece which is bent substantially in a U shape or to produce the frame or components thereof as a casting). To allow the frame, which is of low design, to be tilted to its maximum extent, the lowest point of the platform section is designed to be the narrowest part, while the highest section, just above the back wheel, is designed to be the widest part.

The bearing sleeves 50, 50' for connection to the rotation points 32 (cf. FIG. 5) are diagrammatically depicted at the front end of the bent section 5, 5'. Somewhat further towards the back, the last part of the stabilizing element 14 can also be seen, the figure also indicating that a single rod may be provided with a transverse rod 49 arranged in the form of a T shape, which can then execute hinged movements with respect to the frame parts 5, 5'.

In the platform section 2, 2', the footplate 25 has been partially omitted, and the same applies to the support plate 24 on the tailpiece; in this way, the wheel suspension below is made visible.

FIGS. 9A and 9B show the two-pronged fork 16 in which the axle 17 for the back wheel 4 is arranged. 47 indicates the ball ring which forms the pivot axis for the two-pronged fork.

The angle of the turning axis 15 (cf. FIG. 2) with respect to the road determines the extent to which the back wheel 4 can pivot outwards for a defined tilting angle of the steering column 7–9 and therefore the extent to which the frame 1 can tilt out of its neutral, vertical position. With an angle of 45 degrees between the road and the turning axis 15, a tilting angle of the steering column leads to an approximately similar angle of deflection of the back wheel. If an angle of greater than 45 degrees is selected, the extent of deflection of the back wheel increases disproportionately, and if an angle of less than 45 degrees is selected for the turning axis, the angle of deflection is likewise reduced disproportionately. Since the maximum angle of deflection of the back wheel in which it is still possible to successfully control a vehicle of the dimensions and design indicated, when travelling through very sharp, quickly taken bends, has proven to be around 35 degrees, and since the maximum tilting angle in a controlled bend is likewise approx. 35 degrees, it is advantageous for the angle of the turning axis 15 with respect to the road to be approximately 45 degrees. If the angle of deflection is greater, the back wheel tends, as it were, to "escape", with the back wheel seeking, as it were, to run away beneath the rider, with the result that the rider loses control of the vehicle. An important effect of the turning structure according to the invention is that, on account of the wide running surface, the back wheel, especially if it is designed as a pair of wheels, when it pivots out, irrespective of the level of tilting and pressure exerted on the frame by the weight of the user's body, always remains substantially vertical with respect to the road, with the running surface substantially flat on the road. As a result, the outward pivoting of the back wheel in principle leads to scarcely any additional friction and resistance with respect to the neutral direction of travel, with the result that the distance covered by each push will on average be greater than if only the front wheel were able to turn. As a result, the vehicle according to the invention provides good maneuverability particularly at very low speeds, and in the process the vehicle loses less speed, so that pushing is required less frequently.

Since especially at relatively high speeds, in bends which are taken sharply as is possible with the vehicle according to the invention on account of the combination of the front and back wheels being turned, high centrifugal forces occur, the back wheel will seek to turn out further than the said maximum safe angle of deflection of 35° which is a direct consequence of the frame being tilted, which would then lead to dangerous situations on account of the back wheel "escaping". This excessive outward pivoting of the back wheel can be limited in a number of ways.

For reasons of simplicity, a single heavy spring could be used, which in the extended position has to fully compensate for the centrifugal force. For this purpose, a substantially U-shaped bracket 52 is mounted on the wheel axle 17 on the two-pronged fork 16, running freely around the running surface of the back wheel 4. In the centre, this bracket is provided with an opening or ring into which the tension spring 53 can be hooked, which is connected, via a known tensioner 54 with screw thread and (wing) nuts, in the direction of the front wheel, to a transverse connection 55 of the frame. When the wheel pivots outwards, the spring 53 is then tensioned further, since the bracket 52 turns with the two-pronged fork. The spring tension can be increased or reduced by tightening or loosening the nut 56 behind the tensioner. In the neutral position of the wheel, a certain pretension needs to be applied to the spring 53. After the spring tension has been adjusted, the tensioner is fixed by means of its counterlocking nut. It is thus possible for the spring and the spring tension to be adjusted to the weight of the rider and to personal preference.

However, a drawback of this is that the heavier the rider, the stronger the spring 53 used has to be and the tauter the spring has to be set in order to allow full dynamic limitation of the angle of deflection. However, this also means that correspondingly more force has to be used in order to overcome the spring tension, i.e. to allow the possibility of steering with the back wheel to be included in the steering process, and the friction with the road will increase correspondingly, to the detriment of the speed. Moreover, a spring of this type is heavy and rather expensive. Therefore, to obtain a vehicle of maximum maneuverability at lower speeds, at which centrifugal forces do not yet play a role, it is better to select a static, fixed limit. This is preferably obtained by allowing the 90-degree corner pieces 57 and 58, which in terms of their design are strong, on the top side of the two-pronged fork, at the transition to the tailpiece 3, to hit the inside of the frame, at locations 59 and 60, respectively. The transverse connection 61 between the tubes, which connects the two tubes with respect to one another, serves to make the frame rigid over its width at these locations. Moreover, as a final advantage, limiting the angle of deflection in this way means that the wheel can never pivot away beneath the frame, and consequently the vehicle cannot become wider when cornering.

With higher driving speeds a fixed mechanical limit of this nature using the frame is preferably nevertheless combined with a spring 53, in order to absorb the energy which is required in order to cause the back wheel 3 to pivot out to its limit, so that this energy can subsequently be partially restored, in the form of speed, when the wheel is pivoted back. Also the degree of elasticity of the material of the running surface plays a role here.

A number of detailed measures which can be used to advantageous effect will now be explained with reference to the various figures.

FIGS. 10A and 10B show the top piece of the steering rod 9 and the handlebars 10. To improve the posture and to attain the results illustrated in FIGS. 3A and 3B, the handlebars are ergonomically shaped. For this purpose, the top end of the steering rod 9 is bent forwards at an angle of approximately 55 degrees, as indicated by 63. To ensure that the hands grip the ends of the handlebars 10 precisely in line with the lower arm, the two halves of the handlebars 10 on either side of a center piece 64 are each bent gradually backwards at an angle of approximately 30 degrees, as indicated by 65, 66. If the bent parts are no longer than the width of a hand, i.e. approx. 10 cm, and are then also tilted downwards with respect to center piece 64, at an angle of approximately 15 degrees with respect to the steering column 9, the hands grip the handlebars in an anatomical resting position with respect to the lower arms, and the extended arms facing towards one another, together with the shoulder part as a base, are stiffened to form a triangle, as it were. This position of the arms discourages turning the handlebars and promotes body steering using the back wheel according to the invention.

The new handlebars are much smaller than traditional handlebars, which had to be responsible for the entire steering function themselves, for which purpose a large turning moment, i.e. a large turning arm, was therefore desirable. In the vehicle according to the invention, the steering function of the steering rod is reduced to altogether a secondary function; this is because the steering takes place primarily by simply tilting the entire steering rod out of the vertical plane, with the result that the pivoting back wheel moves into the desired bends. The narrow handlebars then provide a holding and supporting function.

FIG. 11A diagrammatically depicts that a mudguard 67 is arranged on the front of the frame, this mudguard being illustrated separately in FIG. 12. The hole 68 is used to fit the mudguard around the bottom tube element of the fixed steering tube assembly 40 (cf. FIG. 5), and two holes 69 are used to fix it to the frame.

FIG. 13 shows that two pins 70 may be arranged on the clamping sleeve 48 at the top of the fork rod 8 (FIG. 5), these pins preferably each being provided with a rounded part at their end. As a result, it is possible to hang a bicycle basket or another type of baggage from the steering column, as diagrammatically indicated in FIG. 14. To hang a briefcase, it is possible for a wire bracket (71) to be attached to the pins.

FIG. 11A also shows that the scooter can be provided with a slide tray 72, which is shown as a separate component in FIGS. 15A and 15B. A component of this type offers additional options for passing over large differences in level, for example a kerb, despite the small back wheel, by using the bracket 74 and tray 75 to slide over the obstacle. The dihedral transition 73 between the bracket 74 and the actual slide tray 75 serves to allow lateral sliding over a pipe or an edge, for example a kerb, during which process the front wheel is generally steered along the said pipe or kerb at a lower level. Stunts of this type are known as "grinding" when skating.

In the design with double back wheels, the slide tray function can also be derived from the supporting arm to which the wheels are attached. In this case, this arm continues forwards towards the road and, outside the wheel area, faces back round towards the platform section, so that the end lies in the area between the frame tubes. When the back wheel pivots outwards, the end of the supporting arm then runs into a frame tube, with the supporting arm at the same time serving as a mechanical angle limiter. It is also then possible for the end to serve as an attachment point for the tension spring which is to cause the wheel to spring back into the starting position.

Figure 11B:
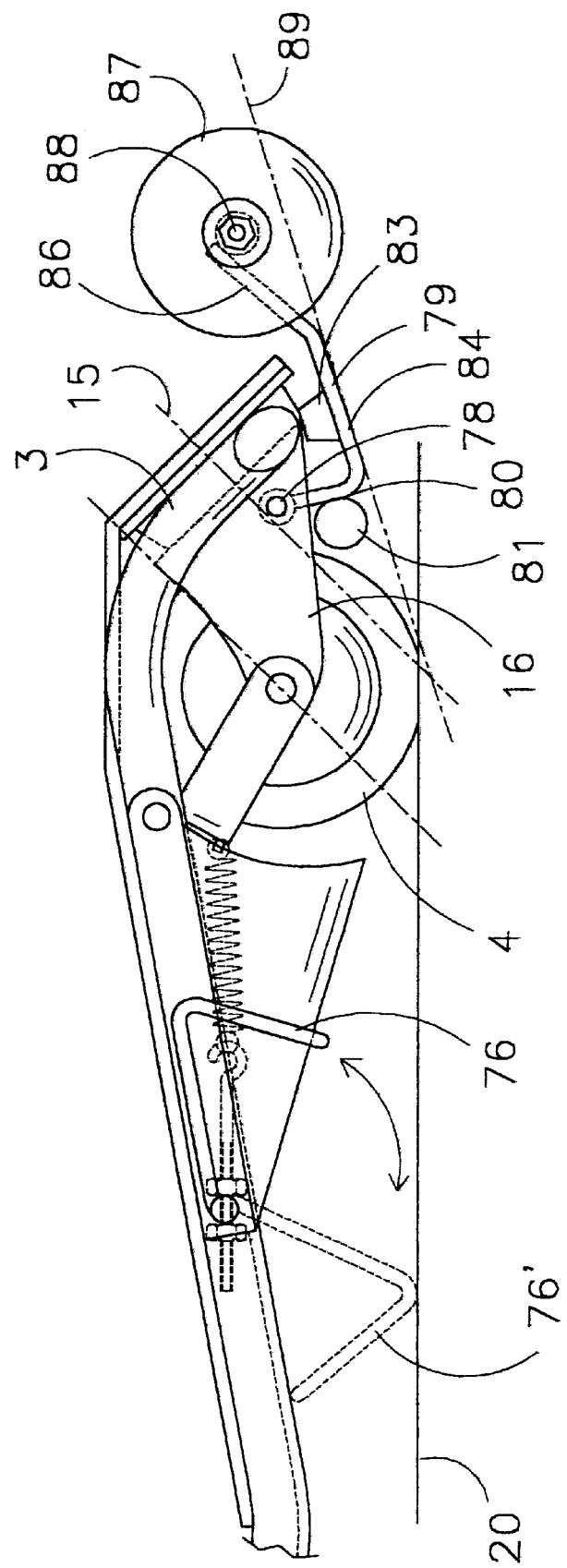
FIG. 11B shows the back section on an enlarged scale.

Next, FIGS. 11A and 11B show a stand 76 which, as is known from other objects, is made as a simple wire bracket which can clamp onto the side of the frame using the resilient properties of steel. From this position, it can easily be kicked round into the position 76' shown in dashed lines. In this position, it provides a three-point support for the scooter, i.e. the two ends of the bracket and the point of contact of the back wheel.

FIG. 6 also shows a brake, which is denoted overall by 77. Another design of this brake is shown on a larger scale in FIGS. 11A and 11B. A pin 78 is fitted through the two limbs of the two-pronged fork 16, at a short distance behind the turning axis 15. A lever 79 can rotate on the said pin between the limbs of the two-pronged fork 16. This lever is bent at right angles, and the section located in the vicinity of the pin 78 bears a brake block 81 on the front side, which brake block, in the at-rest position, is at a short distance from the circumference of the back wheel 4. This at-rest position is determined by a coil spring about pin 78, which is active between lever 79 and two-pronged fork 16 and which causes the lever 79 to rotate to the left about its pin 78, until it presses against the end of the two-pronged fork 16 by means of an abutment block 83. In this design, that section 84 of lever 79 which has the abutment block 83 runs obliquely downwards at an angle of approximately 20 degrees, specifically in such a manner that the point of intersection with the road 20 lies just behind the line of contact between the back wheel 4 and the road. The embodiments shown in FIGS. 6, 8A and 8B show that end of the brake lever which lies beyond the abutment block 83, indicated by 85. The inclination of the lever part 84 is selected in such a way that the latter, for example when driving off a kerb, ensures that the scooter can continue to slide onwards and that the lever 79 absorbs the shock. In a situation in which the front wheel comes off the road, this lever part, on account of the angle or positioning indicated, will come to lie flat on the road, as the absolute limit to the upward movement of the front wheel. The end 85 is used for actuation; it can be actuated by the toe or the center of the foot of the pushing leg 23 in the position illustrated in FIG. 4.

Returning to FIG. 11B, it can be seen that the end 86 is also bent further upwards but bears a small wheel 87 with a rotation axle 88 which is parallel to the rotation pin 78 and the wheel axles. This small wheel projects downwards below the line 89 which indicates the direction of the lever part 84. Thus, when driving off a kerb or during stunts, this small wheel will be the first part which comes into contact with the road 20, thus preventing the lever part 84 from being scraped. If appropriate, it is also possible to use two small wheels 87 of this type.

Since the brake block 81 is susceptible to wear, it may be arranged replaceably on the lever 79. A part which can be replaced as a unit is also possible.

Other options for maneuver are produced if not only the back wheel is designed to be pivotable, in the manner described, but also the front wheel is supported by means of its axle in a two-pronged fork or other shaped part which can pivot freely with respect to the front part of the frame about an axis which is at an acute angle, substantially mirror-symmetrically with respect to the mounting of the back wheel. Since, in this way, in the event of the scooter as a whole being tilted slightly out of the vertical plane, both the front and back wheels react, it is possible to cover even very tight bends. It is then no longer possible to steer the front wheel in the traditional way, and consequently a non-rotatable tilting element is used instead of rotatable handlebars, this element being rigidly connected to the frame at least in the lateral direction.

The said tilting element, which therefore in functional terms takes the place of the steering column, can still be provided with handlebars for the two hands to be placed on or with a single knob for operation using one hand.

This design can also be made foldable, so that it can be carried easily. This is done using the same principles as those described above, namely by securing the front wheel of the frame with respect to the tilting element by means of a hinge pin which, in the "straight-on position of the front wheel" is perpendicular to the longitudinal central plane of the frame.

It is then also possible to provide a stabilizing element which can execute hinged movements with respect to the frame and is hingedly connected to an element which can slide with respect to the tilting element.

In fact, FIGS. 6, 8A, 8B, 11A and 11B already show a mixture of the preferred embodiments described if the front fork and steering column are made to project backwards instead of forwards, as is customary, this being possible by using the shape and dimensions of the bent section 5. The result is optimum maneuverability and direct steering. Thus, although, inter alia, the pivot arm of the front wheel is smaller and the pivot axis is less inclined than that of the back wheel, the front wheel will still turn with the tilting of the frame, albeit to a lesser extent. In particular, the wide, flat running surface of the front wheel, which is larger in relative terms,—or, when using a double front sheel: the spaced apart contact surfaces—ensure that this is the case. However, since the front wheel is much less self-aligning than the back wheel, it can easily be steered back or adjusted without particular effort using the arms, so that in emergencies it can be made to deviate at all times. Moreover, the speed that can be gained by means of spring 4 can now also be achieved via the front wheel by the rider using his arms, by steering in the opposite direction when cornering.

The frame can be designed in such a way that the handlebars together with front wheel can be turned through 360°.

Another interesting possibility is for the scooter to be designed for use on snowy ground, whether this be horizontal or in the form of a snowy slope. In that case, the front and back wheels can be replaced by a front and back board, in principle of the type known as "snowboards" or by short skis. For use on ice, the wheels are replaced by double skates or double blades. In terms of all the details, for the most part it is possible to follow the guidelines which have been described for the wheeled design.

With two wheels next to one another, at the rear and/or at the front, the same effect in terms of the riding characteristics is achieved as with the above-mentioned wide, planar running surface of a single wheel. If a pair of wheels is used, they do not themselves have to have wide running surface, but rather, in order to reduce the rolling resistance, may have punctiform type profiles. As has been stated, polyurethane is a suitable material, on account of its combination of hardness and elasticity ("high rebound" effect).

The advantage of a double front wheel is that greater stability in the direction of travel is obtained and that the lowest point of the frame can be designed even closer to the road. Also, it is then possible for the standing foot to be positioned further forwards, since the narrowest part of the frame can be made wider. Finally, this also makes a stand superfluous.

The idea of this invention can also be implemented if a single arm is selected as the shaped part 16 instead of a double-pronged fork, with a back wheel axle for supporting two back wheels extending on either side of this arm. The same also applies if a turning unit is used at the front.

Finally, it is pointed out that the scooter according to the invention is also suitable for the provision of a motor drive.

It will be apparent that the present invention has been described herein with reference to certain preferred or exemplary embodiments which may be modified, changed, added to or deviated from without departing from the intent, spirit and scope of the present invention. It is intended that all such additions, modifications, amendments and/or deviations be included within the scope of the following claims.

What is claimed is:

1. A two-axled vehicle, comprising:
    a frame having a platform section and a tailpiece toward a back of said frame;
    a steering column arranged toward a front of said frame, said column including a steering rod;
    a front wheel having a front axle, said front wheel being arranged toward a front of said frame;
    a rear wheel having a rear axle, said rear wheel being arranged toward said back of said frame; and
    a shared part interposed between said rear wheel and said tailpiece, said shaped part being freely pivotable with respect to said tailpiece about a pivot axis, said pivot axis being directed at an acute angle with respect to a support surface for said wheels, wherein said tailpiece projects as far as behind said rear wheel, and wherein said rear axle is situated in front of said pivot axis, wherein said platform section runs obliquely forwards and downwards in a direction which intersects said front wheel in the vicinity of a point where said front wheel is in contact with said support surface, wherein at least a part of said frame is at a lower level than a highest point of said rear wheel, and wherein a highest section of said frame, above said rear wheel, is a widest part of said frame.

2. A two-axled vehicle, comprising:
    a frame having a platform section and a tailpiece toward a back of said frame;
    a steering column arranged toward a front of said frame, said column including a steering rod;

a front wheel having a front axle, said front wheel being arranged toward a front of said frame;

a rear wheel having a rear axle, said rear wheel being arranged toward said back of said frame; and a shaped part interposed between said rear wheel and said tailpiece, said shaped part being freely pivotable with respect to said tailpiece about a pivot axis, said pivot axis being directed at an acute angle with respect to a support surface for said wheels, wherein said tailpiece projects as far as behind said rear wheel, and wherein said rear axle is situated in front of said pivot axis, wherein said frame further includes an S-shaped section connected to said steering column, said S-shaped platform section being connected to said steering column at a front point that is elevated with respect to said platform section of said frame.

3. A two-axled vehicle, comprising:

a frame having a platform section and a tailpiece toward a back of said frame;

a steering column arranged toward a front of said frame, said column including a steering rod;

a front wheel having a front axle, said front wheel being arranged toward a front of said frame;

a rear wheel having a rear axle, said rear wheel being arranged toward said back of said frame; and a shaped part interposed between said rear wheel and said tailpiece, said shaped part being freely pivotable with respect to said tailpiece about a pivot axis, said pivot axis being directed at an acute angle with respect to a support surface for said wheels, wherein said tailpiece projects as far as behind said rear wheel, and wherein said rear axle is situated in front of said pivot axis, wherein said frame, at least in a region in front of where the shaped part is attached to the tailpiece, comprises two frame parts having a gap therebetween, and wherein a top surface of said shaped part includes a plurality of front corners arranged between and at a predetermined distance from said frame parts, wherein said frame parts are configured so as to limit an angle of deflection of said shaped part and said rear wheel.

4. A two-axled vehicle, comprising:

a frame having a platform section and a tailpiece toward a back of said frame;

a steering column arranged toward a front of said frame, said column including a steering rod;

a front wheel having a front axle, said front wheel being arranged toward a front of said frame;

a rear wheel having a rear axle, said rear wheel being arranged toward said back of said frame; and a shaped part interposed between said rear wheel and said tailpiece, said shaped part being freely pivotable with respect to said tailpiece about a pivot axis, said pivot axis being direct at an acute angle with respect to a support surface for said wheels, wherein said tailpiece projects as far as behind said rear wheel, and wherein said rear axle is situated in front of said pivot axis, wherein said frame comprises a pair of substantially parallel tubes, said vehicle further comprising a resilient footplate arranged between said tubes via at least one transverse support.

5. A vehicle as in claim 4, wherein said transverse support comprises a plurality of angled stripe configured so as to cause said footplate to adopt a slightly concave, prestressed position.

6. A two-axled vehicle, comprising:

a frame having a platform section and a tailpiece toward a back of said frame;

a steering column arranged toward a front of said frame, said column including a steering rod;

a front wheel having a front axle, said front wheel being arranged toward a front of said frame;

a rear wheel having a rear axle, said rear wheel being arranged toward a back of said frame; and a shaped part interposed between said rear wheel and said tailpiece, said shaped part being freely pivotable with respect to said tailpiece about a pivot axis, said pivot axis being directed at an acute angle with respect to a support surface for said wheels, wherein said tailpiece projects as far as behind said rear wheel, and wherein said rear axle is situated in front of said pivot axis, wherein said steering column includes a steering tube interposed between said steering rod and said frame, said vehicle further comprising a rotary hinge element connecting said steering tube to said frame said hinge pin being perpendicular to a longitudinal axis of said frame when said front wheel is in a "straight-on" position.

7. A vehicle as in claim 6, wherein said hinge includes a hinge pin arranged in front of a centre axis of said steering column.

8. A two-axled vehicle, comprising:

a frame having a platform section and a tailpiece toward a back of said frame;

a steering column arranged toward a front of said frame, said column including a steering rod;

a front wheel having a front axle, said front wheel being arranged toward a front of said frame;

a rear wheel having a rear axle, said rear wheel being arranged toward said back of said frame; and a shaved part interposed between said rear wheel and said tailpiece, said shaped part being freely pivotable with respect to said tailpiece about a pivot axis, said pivot axis being directed at an acute angle with respect to a support surface for said wheels, wherein said tailpiece projects as far as behind said rear wheel, and wherein said rear axle is situated in front of said pivot axis, further comprising a stabilizing element hingedly connecting said steering tube to said frame, wherein said steering column comprises a fork rod toward a bottom thereof, a fixed steering tube assembly adjacent to said fork rod, including a hinge pin for connecting said frame to said fork rod, and a slideable steering tube assembly adjacent said fixed steering assembly, wherein said hinge pin is configured so as to allow said fork rod to be rotated but not displaceable in an axial direction, and said slideable steering tube assembly is configured so as to slide in said axial direction and rotate about said fork rod.

9. A vehicle as in claim 8, wherein said front wheel, said steering column, said fixed steering tube assembly, said slideable steering tube assembly and said stabilizing element are configured so as to permit it said steering column to be at least one of statically and dynamically adjustable between a forward inclined position and a backward declined position.

10. A vehicle as in claim 9, wherein said slideable steering tube assembly comprises a bottom fixing element and a top fixing element, said bottom and top fixing elements being resiliently connected, by a rotary/sliding element.

11. A vehicle as in claim 10, wherein said bottom and top fixing elements of said slideable steering tube assembly are fixed with respect to said fork rod by a manually operated device.

12. A vehicle as in claim 10, wherein said bottom and top fixing elements are connected to said rotary/sliding element by a compression spring positioned about said fork rod.

13. A two-axled vehicle, comprising;

a frame having a platform section, and a rear wheel arranged toward a back thereof; a steering column arranged toward a front of the frame, the steering column including a steering rod and at least one handlebar and being connected to at least one front wheel, wherein the steering column adopts a fixed, inclined-forward position in which the handlebar, in projection, is forward to a front of the front wheel when the steering rod is in a lowermost position wherein the platform section runs obliquely forwards and downwards in a direction which intersects the front wheel in the vicinity of a location where said front wheel is in contact with a support surface, while at least a part of the frame is at a lower level than a highest point of the back wheel.

14. A vehicle as in claim 13, wherein said vehicle is collapsible and wherein the steering column, in a folded-up position, takes an inclined-forward position, and wherein an axle of the front wheel is situated behind a centre axis of the steering column.

* * * * *